United States Patent
Kawai et al.

(10) Patent No.: US 8,697,201 B2
(45) Date of Patent: Apr. 15, 2014

(54) RETARDATION FILM AND PRODUCTION METHOD THEREOF

(75) Inventors: Yoshikazu Kawai, Settsu (JP); Masato Shintaku, Sakai (JP); Masaaki Nakamura, Nishinomiya (JP)

(73) Assignee: Kaneka Corporation, Osaka (JP)

( * ) Notice: Subject to any disclaimer, the term of this patent is extended or adjusted under 35 U.S.C. 154(b) by 1895 days.

(21) Appl. No.: 11/909,868

(22) PCT Filed: Mar. 28, 2006

(86) PCT No.: PCT/JP2006/306205
§ 371 (c)(1),
(2), (4) Date: Sep. 27, 2007

(87) PCT Pub. No.: WO2006/106639
PCT Pub. Date: Dec. 10, 2006

(65) Prior Publication Data
US 2009/0273837 A1  Nov. 5, 2009

(30) Foreign Application Priority Data
Mar. 31, 2005 (JP) ................................. 2005-105538

(51) Int. Cl.
*C09K 19/00* (2006.01)
*B29D 7/01* (2006.01)
*G02B 27/02* (2006.01)

(52) U.S. Cl.
USPC .................... 428/1.33; 264/1.34; 359/489.07

(58) Field of Classification Search
USPC .................. 428/1.33, 1.54; 349/96, 117–118
See application file for complete search history.

(56) References Cited

U.S. PATENT DOCUMENTS

| | | | |
|---|---|---|---|
| 7,635,506 B2 * | 12/2009 | Takagi | ........................ 428/1.33 |
| 2001/0041263 A1 * | 11/2001 | Sweet | ........................... 428/439 |
| 2002/0080306 A1 * | 6/2002 | Takahashi et al. | .............. 349/89 |
| 2005/0123693 A1 | 6/2005 | Ito | |

FOREIGN PATENT DOCUMENTS

| | | | |
|---|---|---|---|
| JP | 2000-314811 | 11/2000 | |
| JP | 2001-100027 | 4/2001 | |
| JP | 2002-040244 | 2/2002 | |
| JP | 2002-267844 | 9/2002 | |
| JP | 2003-073485 | 3/2003 | |
| JP | 2003-105129 | 4/2003 | |
| JP | 34-59779 | 8/2003 | |
| JP | 3459779 | 8/2003 | |
| JP | 2003-315538 | 11/2003 | |
| JP | 2004099639 A * | 4/2004 | ............... C09D 4/00 |
| JP | 2004-252262 | 9/2004 | |
| JP | 2005-062811 | 3/2005 | |
| TW | 200403453 A | 3/2004 | |
| TW | 200502567 A | 1/2005 | |

OTHER PUBLICATIONS

JPO Website Machine English Translation of JP 2003-073485, Fujihana et al., Mar. 12, 2003.*
JPO Website Machine English Translation of JP 2004-339348, Fujihana, Dec. 2, 2004.*
JPO Website Machine English Translation of JP 2002-267844, Ito, Sep. 18, 2002.*
JPO Website Machine English Translation of JP 2001-100027, Yajima et al., Apr. 13, 2001.*
International Search Report for corresponding Application No. PCT/JP2006/306205 mailed Jun. 27, 2006 (English translation of original submitted on Sep. 27, 2007).
International Search Report for corresponding Application No. PCT/JP2006/306205 mailed Jun. 27, 2006.

* cited by examiner

*Primary Examiner* — Ellen S Raudenbush
*Assistant Examiner* — Anthony J Frost
(74) *Attorney, Agent, or Firm* — Renner, Otto, Boisselle & Sklar, LLP

(57) ABSTRACT

The present invention is to provide a retardation film having excellent durability against temperature change or the like and a production method of the retardation film. Particularly, the present invention is to provide a retardation film which realizes both reverse wavelength dispersion and durability and a production method of the retardation film. This is achieved by a retardation film including: a component (A) which is specific cellulose acylate; and a component (B) which is cellulose acylate or cellulose ether having a molecular weight different from a molecular weight of the component (A) and whose residual degree of hydroxyl group is 0.30 or more.

13 Claims, No Drawings

RETARDATION FILM AND PRODUCTION METHOD THEREOF

TECHNICAL FIELD

The present invention relates to a cellulosic retardation film which shows arbitrary wavelength dispersion. Further, the present invention relates to a cellulosic retardation film which shows reverse wavelength dispersion.

BACKGROUND ART

With wide use of an optical film for a display device, particularly for a liquid crystal display device, the optical film has been required to have higher functions. As a particularly important one of these requirements, an optical film having higher retardation for a longer wavelength in a visible light area is required. Such an optical film has a characteristic opposite to wavelength dispersion of an optical film constituted of a single plate of generally used resin such as polycarbonate, and such an optical film is therefore generally referred to as "reverse wavelength dispersion film". In a reflective liquid crystal display device and the like, the reverse wavelength dispersion film can be used as a retardation film for converting linearly polarized light into circularly polarized light and for converting circularly polarized light into linearly polarized light. Recently, the reverse wavelength dispersion film is expected as a film whose object is to reduce color shift caused by a viewing angle of a polarization plate, that is, as a compensation film for polarization plate, and is further expected also as a protection film for polarizer, which has a retardation. As a single reverse wavelength dispersion film, a film containing cellulose acetate is known (for example, see Patent Document 1). However, due to the poor dissolubility of cellulose acetate to a solvent, available solvents for solvent casting method are limited. Further, cellulose acetate is difficult to be dissolved in a solvent of methylene chloride that is generally used in the solvent casting method. Further, as a cellulose acetate film is not easy to be processed and is hard to handle, an excessive amount of plasticizer is often used. However, when the plasticizer is used in an excessive amount, a problem arises in that the reverse wavelength dispersion decreases.

As a method for solving the problem caused by cellulose acetate, a reverse wavelength dispersion film made of cellulose acetate propionate is proposed (for example, see Patent Document 2).

While, the reverse wavelength dispersion film is expected as a retardation film for a reflective liquid crystal display device frequently used in the open air or a polarization plate compensation film for a large screen liquid crystal display device. Further, with wider variety of purposes of the liquid crystal display device, the reverse wavelength dispersion film has been used in various circumstances. It is preferable that environmental change, particularly temperature change hardly causes a crack to occur in the reverse wavelength dispersion film. However, the retardation film disclosed by Patent Document 2 has a problem in terms of durability in view of mechanical strength against temperature change.

Patent Document 1

Japanese Unexamined Patent Publication No. 137116/2000 (Tokukai 2000-137116)

Patent Document 2

Japanese Unexamined Patent Publication No. 315538/2003 (Tokukai 2003-315538)

DISCLOSURE OF INVENTION

Problems to be Solved by the Invention

The present invention is to provide a retardation film having excellent durability against temperature change or the like, and particularly to provide a retardation film which has improved durability while realizing reverse wavelength dispersion.

Means to Solve the Problems

In order to solve the foregoing problems, the inventors of the present invention diligently studied, thereby completing the present invention.

That is, the present invention relates to a retardation film is made of a material containing the following components (A) and (B).

Component (A): Cellulose acetate satisfying the following expression (1)

$$2.20 \leq DSac(A) + DSay(A) \leq 2.90 \tag{1}$$

where $DSac(A)$ represents a acetyl substitution degree of the component (A), and $DSay(A)$ represents a total substitution degree of acyl group which constitutes the component (A) and whose carbon number is three or four.

Component (B): Cellulose acylate or cellulose ether whose molecular weight is different from a molecular weight of the component (A) and whose residual degree of hydroxyl group is 0.30 or more.

It is preferable to arrange the retardation film as set forth in claim 1 so that the component (A) satisfies the following expression (2), $$DSay(A)/DSac(A) \geq 2 \tag{2}$$

It is preferable to arrange the retardation film so that the component (B) is cellulose acylate satisfying the following expressions (3) and (4), and the components (A) and (B) satisfy the following expression (5), $$2.00 \leq DSac(B) + DSay(B) \leq 2.70 \tag{3}$$

$$DSay(B)/DSac(B) \geq 2 \tag{4}$$

$$(DSac(A) + DSay(A)) - 0.05 \geq (DSac(B) + DSay(B)) \tag{5}$$

where $DSac(B)$ represents an acetyl substitution degree of the component (B), and $DSay(B)$ represents a total substitution degree of acyl group which constitutes the component (B) and whose carbon number is three or four.

It is preferable to arrange the retardation film so that cellulose acylate of the component (A) is cellulose acetate propionate satisfying the following expressions (6) and (7), and cellulose acylate of the component (B) is cellulose acetate propionate satisfying the following expressions (8) and (9), $$2.20 \leq DSac(A) + DSpr(A) \leq 2.90 \tag{6}$$

$$DSpr(A)/DSac(A) \geq 2 \tag{7}$$

$$2.00 \leq DSac(B) + DSpr(B) \leq 2.70 \tag{8}$$

$$DSpr(B)/DSac(B) \geq 2 \tag{9}$$

where DSpr(A) represents a propionyl substitution degree of the component (A), and DSpr(B) represents a propionyl substitution degree of the component (B).

It is preferable to arrange the retardation film so that the components (A) and (B) satisfy the following expression (10), $$10{,}000 \leq Mn(A) - Mn(B) \leq 100{,}000 \tag{10}$$

where Mn(A) represents a number average molecular weight of the component (A) on the basis of gel permission chromatography and Mn(B) represents a number average molecular weight of the component (B) on the basis of the gel permission chromatography.

It is preferable to arrange the retardation film so that Mn(A) and Mn(B) respectively satisfy the following expressions (11) and (12), $$Mn(A) = 30{,}000 \text{ to } 150{,}000 \tag{11}$$

$$Mn(B) = 10{,}000 \text{ to } 50{,}000 \tag{12}$$

It is preferable to arrange the retardation film so that a molecular weight distribution (Mw(A)/Mn(A)) of the component (A) is 2.5 to 5.0, and a molecular weight distribution (Mw(B)/Mn(B)) of the component (B) is 1.5 to 4.0, and (Mw(A)/Mn(A))>(Mw(AB)/Mn(AB)), where Mw(AB) represents a weight average molecular weight of a mixture of the components (A) and (B) on the basis of the gel permission chromatography and Mn(AB) represents a number average molecular weight of the mixture of the components (A) and (B) on the basis of the gel permission chromatography.

It is preferable to arrange the retardation film so that cellulose acylate is such that:

an amount of the component (A) is 20 to 50 wt %, and
an amount of the component (B) is 80 to 50 wt %.

It is preferable to arrange the retardation film so that the following expressions (13) and (14) are satisfied, $$Re(450)/Re(550) = 0.80 \text{ to } 0.95 \tag{13}$$

$$Re(550) < Re(650) \tag{14}$$

where Re(450), Re(550), and Re(650) respectively represent retardation values at a wavelength of 450 nm, a wavelength of 550 nm, and a wavelength of 650 nm.

The present invention further relates to an optical compensation polarization plate including the aforementioned retardation film.

It is preferable to arrange the optical compensation polarization plate so that the retardation film is laminated directly onto a polarizer.

The present invention further relates to a method for producing the aforementioned retardation film, and said method includes the step of casting onto a support body a solution containing the components (A) and (B).

It is preferable to arrange the method so that the solution contains methylene chloride.

It is preferable to arrange the method so that a solvent contained in the solution includes 70 to 99 wt % of methylene chloride and 1 to 30 wt % of alcohol whose carbon number is three or less.

It is preferable to arrange the method so that the retardation film is drawn at least in an uniaxial direction.

Preferably, the present invention relates to a method for producing an optical compensation polarization plate, and said method includes the step of laminating the retardation film onto a polarizer with a protection film for polarizer, and/or other optical member.

Preferably, the present invention relates to a method for producing an optical compensation polarization plate, and said method includes the step of laminating the retardation film directly onto a polarizer.

Effects of the Invention

According to the present invention, it is possible to obtain a retardation film having excellent durability against temperature change or the like. Particularly, it is possible to obtain a retardation film which has improved durability while realizing reverse wavelength dispersion.

BEST MODE FOR CARRYING OUT THE INVENTION

The retardation film of the present invention is a retardation film including the following components (A) and (B).

Component (A): Cellulose acetate satisfying the following expression (1)

$$2.20 \leq DSac(A) + DSay(A) \leq 2.90 \tag{1}$$

where DSac(A) represents an acetyl substitution degree of the component (A), and DSay(A) represents a total substitution degree of acyl group which constitutes the component (A) and whose carbon number is three or four.

Component (B): Cellulose acylate or cellulose ether whose molecular weight is different from a molecular weight of the component (A) and whose residual degree of hydroxyl group is 0.30 or more.

DSac(A)+DSay(A) represents a degree to which three hydroxyl groups existing in second, third, and sixth positions of a cellulose molecule are respectively acylated on average. Substitution degrees in the respective positions may be even or may be uneven. Further, a substitution degree of acyl group is quantifiable in accordance with a method described in ASTM-D817-96.

The expression (1) has the following meaning. A film constituted of cellulose acylate whose hydroxyl groups are entirely acylated and whose DSac(A)+DSay(A) is 3 is uniaxially drawn, so that this results in a retardation film which has negative birefringence, wherein the direction orthogonal to the drawing direction is in the slow axis direction. A phase difference (retardation) of the retardation film shows such wavelength dispersion that the phase difference (absolute value) is likely to increase for a shorter wavelength. If DSac(A)+DSay(A) is decreased from 3, the phase difference caused by the drawing is less likely to occur, so that the film hardly have the phase difference even when the film is drawn by about 2.8 to 2.9 times. If DSac(A)+DSay(A) is further decreased, the drawing direction corresponds to a slow axis direction, so that the film becomes a positive-birefringence film. Accordingly, the wavelength dispersion of the phase difference of the retardation film is such that the phase difference (absolute value) is likely to increase for a longer wavelength. If DSac(A)+DSay(A) is further decreased, this tendency is lost, so that the phase difference is constant regardless of the wavelength. The DSac(A)+DSay(A) indicative of the constant phase difference regardless of the wavelength varies depending on a ratio of DSac(A) and DSay(A), but is substantially in a range from 2.0 to 2.3. Further, if DSac(A)+DSay(A) is further decreased, the film becomes such a retardation film that the phase difference (absolute value) increases for a shorter wavelength as in a polycarbonate retardation film.

For the aforementioned reason, DSac(A)+DSay(A) does not exceed 3. Further, in view of that display quality of the liquid crystal display device is impaired when the phase difference is likely to increase for a shorter wavelength, it is appropriate to set DSac(A)+DSay(A) be 2.00 or larger. In case where it is not desired to obtain negative birefringence, it is necessary to set that DSac(A)+DSay(A) be 2.90 or smaller.

In view of the aforementioned wavelength dispersion, it is possible to achieve the object also by substituting hydroxyl group of cellulose by acetyl group or propionyl group as disclosed by Patent Document 1. However, as mentioned in Patent Document 2, it is preferable that a highly concentrated solvent can be prepared in order to form a film whose thickness is highly precise in accordance with the solvent casting method. Also from this view point, cellulose acylate whose substitution degree (DSay(A)) of acyl group whose carbon number is three or four has higher solubility with respect to an organic solution than cellulose acylate whose acetyl substitution degree (DSac(A)) is high. Particularly in case of using methylene chloride, there is a great difference therebetween. Thus, it is more preferable that DSay(A) is higher. That is, it is preferable that the component (A) satisfies the following expression (2).

$$DSay(A)/DSac(A) \geq 2 \quad (2)$$

However, if nothing other than the component (A) is included, this raises a problem in terms of durability in view of mechanical strength (hereinafter, referred to merely as "durability") against temperature change. Thus, cellulose acylate or cellulose ether whose molecular weight is different from a molecular weight of the component (A) and whose residual degree of hydroxyl group is 3.0 or more is included as the component (B), thereby improving the durability against temperature change.

As to cellulose acylate or cellulose ether whose residual degree of hydroxyl group is 3.0 or more, there is no particular limitation as long as cellulose acylate or cellulose ether is compatible with the component (A). The wording "compatible" expresses the following state: In case where a film whose thickness is 100 μm is produced, a haze thereof is 5% or less at least when 1 wt % or more of resin is included in the component (B). As described above, an optical property can be adjusted depending on DSac(A)+DSay(A), but the optical property is based not only on the acyl group and it is often that the same effect can be obtained also on the basis of a substituent group other than the hydroxyl group. In other words, "how large the residual degree of hydroxyl group is" serves as an index of the optical property. The residual degree of hydroxyl group is obtained by subtracting a total substitution degree of substituent group other than hydroxyl group from 3.

There is no particular problem as long as the residual degree of hydroxyl group of the component (B) is 0.30 or more. However, in view of the solubility, it is preferable that the residual degree of hydroxyl group is 0.30 to 1.00. When the residual degree of hydroxyl group exceeds 1.00, the solubility decreases and it is difficult to obtain the reverse wavelength dispersion film. Thus, it is not preferable that the residual degree of hydroxyl group exceeds 1.00.

In case where the component (B) is cellulose ether, it is preferable to use ethyl cellulose obtained by substituting hydroxyl group of cellulose by ethoxy group in view of easiness to process and the solubility. The substitution degree of ethoxyl group is quantifiable in accordance with the method described in ASTM-D4794-94.

Further, it is more preferable to use cellulose acylate which has excellent solubility and excellent compatibility with the component (A) and satisfies the following expressions (3) and (4). Further, in case where the components (A) and (B) are in a relation which satisfies the following expression (5), the retardation may be more likely to occur, so that the foregoing relation is preferable.

$$2.00 \leq DSac(B)+DSay(B) \leq 2.70 \quad (3)$$

$$DSay(B)/DSac(B) \geq 2 \quad (4)$$

where DSac(B) represents an acetyl substitution degree of the component (B), and DSay(B) represents a total substitution degree of acyl group which constitutes the component (B) and whose carbon number is three or four.

$$(DSac(A)+DSay(A))-0.05 \geq (DSac(B)+DSay(B)) \quad (5)$$

As acyl group other than the acetyl group, it is preferable to use propionyl group or butyl group whose carbon number is three or four because propionyl group or butyl group can be industrially easily obtained. Particularly in case of using propionyl group, this is preferable in view of odor. That is, cellulose acylate which can be particularly favorably used for the components (A) and (B) is cellulose acetate propionate which satisfies the following expressions (6) to (9).

$$2.20 \leq DSac(A)+DSpr(A) \leq 2.90 \quad (6)$$

$$DSpr(A)/DSac(A) \geq 2 \quad (7)$$

$$2.00 \leq DSac(B)+DSpr(B) \leq 2.70 \quad (8)$$

$$DSpr(B)/DSac(B) \geq 2 \quad (9)$$

where DSpr(A) represents a propionyl substitution degree of the component (A), and DSpr(B) represents a propionyl substitution degree of the component (B).

There is no particular limitation concerning molecular weights of the components (A) and (B), and any values can be set as the molecular weights as long as the molecular weights are different from each other. Further, it is preferable that the molecular weight of the component (D) satisfies the following expression (10) in view of the durability.

$$10,000 \leq Mn(A)-Mn(B) \leq 100,000 \quad (10)$$

where Mn(A) represents a number average molecular weight of the component (A) on the basis of gel permission chromatography and Mn(B) represents a number average molecular weight of the component (B) on the basis of the gel permission chromatography.

Further, it is preferable that the components (A) and (B) satisfy the following expressions (11) and (12). If the molecular weights of the components (A) and (B) respectively exceed the ranges represented by the expressions (11) and (12), this may decrease the solubility with respect to the solvent. Thus, it is not preferable that molecular weights of the components (A) and (B) respectively exceed the ranges represented by the expressions (11) and (12). Further, the excessively high molecular weight raises not only a problem that viscosity of the solvent is too high to be used for the solvent casting method but also a problem that this makes it difficult to carry out thermal molding. While, if the molecular weights are respectively smaller than the ranges represented by the expressions (11) and (12), the mechanical strength of the resultant film may decrease, so that it is not preferable that the molecular weights are respectively smaller than the ranges represented by the expressions (11) and (12).

$$Mn(A)=30,000 \text{ to } 150,000 \quad (11)$$

$$Mn(B)=10,000 \text{ to } 50,000 \quad (12)$$

A distribution of each molecular weight is not particularly limited, but it is preferable that the distribution of the molecular weight of the component (A) (Mw(A)/Mn(A)) is 2.5 to 5.0 and the distribution of the molecular weight of the component (B) (Mw(B)/Mn(B)) is 1.5 to 4.0 and (Mw(A)/Mn(A))>(Mw (AB)/Mn(AB)). If this condition is satisfied, the durability against temperature change is improved. (Mw(AB) represents a weight average molecular weight of a mixture of the components (A) and (B) on the basis of the gel permission chromatography and Mn(AB) represents a number average molecular weight of the mixture of the components (A) and (B) on the basis of the gel permission chromatography.)

Amounts of the included components (A) and (B) are not particularly limited, but it is preferable that the amount of the component (A) is 20 to 50 wt % and the amount of the component (B) is 80 to 50 wt %. If the amounts of the components (A) and (B) are respectively in the aforementioned ranges, it is often that the durability is improved, so that it is preferable that the amounts are respectively in the aforementioned ranges. Generally, if an amount of a compound whose molecular weight is small is 50 wt % or more, the mechanical strength is likely to decrease. This is surprising finding. Further, it is particularly preferable that the amount of the component (A) is 30 to 40 wt % and the amount of the component (B) is 70 to 60 wt %.

The retardation film of the present invention is excellent in the durability against temperature change. This is an effect exhibited by adding the component (B) to the component (A). Furthermore, in case where a difference between the molecular weight of the component (A) and the molecular weight of the component (B) satisfies the aforementioned expression (10), the effect is great. In addition, the effect is great particularly in case where the aforementioned expressions (11) and (12) are satisfied. An example of a method for evaluating the durability against temperature change is the following evaluation method using a thermal analyzer (TMA). The retardation film having been left for 24 hours right after the production thereof at a room temperature of 25° C. and with a humidity of 50% is heated so that its temperature increases from −60° C. to 110° C. at 10° C./minute, and is subsequently cooled down so that its temperature decreases from 110° C. to −60° C. at 10° C./minute. This heating/cooling operation is repeated twice. If dimensional change, at the second operation, in a direction perpendicular to a direction in which the retardation film is drawn at −40° C. (in heating) is 0.5% or more or if (dimensional change at the first operation)/(dimensional change at the second operation) at 85° C. (in heating) is 0.90 or less, this is regarded as a problem in view of the durability against temperature change (the dimensional change is a value with respect to 100% indicative of a dimension of the film having been left for 24 hours right after production thereof at a room temperature of 25° C. with a humidity of 50%). For example, in case where the film is laminated onto the polarizer so as to manufacture the optical compensation polarization plate, long term use thereof results in occurrence of a crack and the like. If the component (B) is mixed with the component (A), the dimensional change at the second operation at −40° C. (in heating) is less than 0.5% in the foregoing evaluation, and (dimensional change at the first operation)/(dimensional change at the second operation) at 85° C. (in heating) exceeds 0.90.

Examples of a typical method for molding the optical film include (i) a melt casting method in which resin is melted and is extruded from a T die and (ii) a solvent casting method in which resin is dissolved in an organic solvent and is cast onto a support body and the solvent is dried into a film by heating. Due to its relative easiness to produce an optical film whose thickness is highly precise, it is preferable to adopt the solvent casting method. If the thickness is less precise, a bump derived from thickness unevenness acts like a lens, so that this may result in distortion (so-called lens effect) of an image in being installed on a liquid crystal display device. Further, retardation (phase difference) is represented by an integration of a birefringence and a thickness, so that in-plane unevenness of the retardation value may occur.

The solvent in adopting the solvent casting method is not particularly limited, but it is more preferable to use a solvent whose boiling point is lower in view of a drying efficiency. Specifically, it is preferable to use a solvent whose boiling point is so low as 100° C. Examples of the usable solvent include: ketones such as acetone, methylketone; and ester solvents such as ethyl acetate, ethyl propionate. Further, a halogenated hydrocarbon solvent such as methylene chloride easily dissolves a resin material and has a low boiling point, so that the halogenated hydrocarbon solvent is one of favorable solvents. Further, methylene chloride has great safety against fire or the like during the drying operation, so that methylene chloride is particularly preferable as a main solvent used in producing the retardation film of the present invention. Further, it is preferable to use a mixture solvent including 70 to 99 wt % of methylene chloride and 1 to 30 wt % of alcohol whose carbon number is three or less because a balance among the safety against fire, the solubility, and the productivity is favorable. As the alcohol whose carbon number is three or less, it is preferable to use ethyl alcohol because ethyl alcohol is safe and has a low boiling point. Further, in order to suppress the cost, it is preferable to include 1 to 10 parts by weight of alcohol which is other than ethyl alcohol and whose carbon number is three or less, out of 100 parts by weight of alcohol whose carbon number is three or less. As the alcohol which is other than ethyl alcohol and whose carbon number is three or less, it is particularly preferable to use isopropyl alcohol in view of the safety and the boiling point. Further, the solvent mentioned herein refers to a solvent whose boiling point is lower than a maximum temperature of a film in the drying step and the drawing step, and a liquid whose boiling point is higher than the maximum temperature in the drying step and the drawing is referred to as a plasticizer.

The cellulose acylate used in the present invention can be produced by a known method. In case of cellulose acetate propionate for example, cellulose is treated with a highly caustic soda solution so as to obtain alkali cellulose, and the resultant alkali cellulose is acylated by a mixture of acetic anhydride and propionic acid anhydride. The substitution degree DSac+DSpr of the resultant cellulose ester is substantially 3. The acyl group is partially hydrolyzed, thereby producing cellulose acetate propionate having a desired substitution degree. Further, a ratio of acetic anhydride and propionic anhydride is changed in acylation, thereby obtaining a desired propionyl substitution degree.

Further, the presence of ester group in the molecule enhances the hydrophilicity of the molecule, so that moisture remaining at the time of formation of the film may have an unfavorable influence on the strength of the resultant film. Thus, it is preferable to dry beforehand a resin, a pellet, a solvent, and the like, that are used to form the film.

Further, in forming the film, a small amount of an additive such as a plasticizer, a heat stabilizer, and an ultraviolet stabilizer may be added. In case where the resultant film is brittle, it is effective to add the plasticizer in order to improve the property at the time of treatment such as the stretching. Particularly in a method for obtaining a retardation film by bonding a thermal shrinkage film described in Tokukai 2001-75098 to a side or each of both sides of a thermoplastic film and by drawing the resultant film while a shrinkage force of the thermoplastic film is acting due to the heating operation, it is important to control a glass transition point, so that it is preferable to add the plasticizer for adjusting the glass transition point. The plasticizer is not particularly limited as long as the plasticizer has a boiling point higher than the maximum temperature of the film in the drying step and the drawing step and is compatible with the component (A). For example, it is possible to favorably use a conventionally known plasticizer for cellulosic resin, such as: castor oil and derivative thereof; a camphor; and the like. However, if a large amount of the plasticizer is included, the phase difference caused by the drawing is less likely to occur and the large amount of the plasticizer causes bleed, so that it is preferable that an amount of the added plasticizer is 5 wt % or less with respect to the entire solid content. Further, a plasticizer containing a large amount of aromatics acts as a retardation enhancer, so that it may be difficult to obtain a desired optical property. In view of these points, it is preferable to use phthalate ester, particularly preferable to use diethyl phthalate, as the plasticizer of the present invention.

In forming the film on the basis of the solvent casting method, the components (A) and (B) of the present invention are dissolved in the aforementioned solvent, and then the resultant solution is cast onto the support body, and the cast resultant is dried into a film. A viscosity of the solution is preferably 1.0 Pa·s or more and 5.0 Pa·s or less, more preferably 1.5 Pa·s or more and 4.0 Pa·s or less. Favorable examples of the support body include: a stainless endless belt; and a film such as a polyimide film, a biaxially drawn polyethylene telephthalate film, and the like.

The drying operation after the casting operation can be carried out while the film is being supported by the support body, but it is possible to as necessary peel from the support body a film having been subjected to preliminary drying operation until the film has a self supporting property so as to further dry the peeled film. In drying the film, generally, it is possible to adopt a floating method and a stenter or roll carriage method. In case of the float method, the film itself receives a complicate stress, so that unevenness of the optical property is likely to occur. Further, in the case of the stenter method, it is necessary to realize a balance between width shrinkage of the film which results from a treatment for drying the solvent and a tension for supporting a weight thereof depending on a distance of a pin or a clip supporting each side of the film, so that it is necessary to carry out complicate control of the width shrinkage. While, in the case of the roll carriage method, a tension for stably carrying the film is exerted in a film flowing direction (MD direction) in principle, it is easy to uniform the direction in which a stress is exerted. Thus, it is most preferable to dry the film in accordance with the roll carriage method. Further, in order to prevent the film from absorbing moisture in drying the solvent, the solvent is dried in an atmosphere whose moisture is kept low. This method is effective in obtaining the film of the present invention whose mechanical strength and transparency are high.

The thickness of the retardation film of the present invention preferably ranges from 10 μm to 500 μm, more preferably from 30 μm to 300 μm. A light transmittance of the film is preferably 85% or more, more preferably 90% or more. Further, a haze of the film is preferably 5% or less, more preferably 3% or less.

In order to obtain the retardation film, the film obtained in the foregoing manner is subjected to an orientation treatment in accordance with a known drawing method, thereby giving an uneven retardation.

The retardation of the retardation film can be set to a value ranging from 5 nm to 1000 nm so as to correspond to a purpose thereof. Particularly in case of using the film of the present invention so as to reduce color shift caused by a viewing angle of a film for reflective liquid crystal display device or a liquid crystal display device, that is, in case of using the film of the present invention as a member constituting the optical compensation polarization plate, the retardation in the wavelength of 550 nm preferably ranges from 70 to 155 nm, more preferably from 80 to 150 nm, still more preferably from 85 to 145 nm. If the retardation is in the aforementioned range, the film can be favorably used as a member constituting the optical compensation polarization plate. In case of using the film as a member constituting the film for reflective liquid crystal display device retardation or the optical compensation polarization plate, the wavelength dispersion is important, so that a reverse wavelength dispersion is required, wherein the longer is the wavelength, the higher is the retardation. In other words, it is preferable that a front retardation Re(λ) at a wavelength of N nm is Re(450)<Re(550)<Re(650). In case where the wavelength dispersion of the phase difference deviates from this range, a state of resultant oval polarized light greatly varies depending on a wavelength in projecting linear polarized light of a visible light area into the film, so that it may be impossible to obtain sufficient optical compensation. Particularly, in case of satisfying the following expressions (13) and (14), it is possible to obtain a high quality liquid crystal display device, so that it is preferable to satisfy the expressions (13) and (14). In case where the wavelength dispersion of the phase difference deviates from the range, color shift caused by a viewing angle may be great.

$$Re(450)/Re(550)=0.80 \text{ to } 0.95 \quad (13)$$

$$Re(550)<Re(650) \quad (14)$$

where Re(450), Re(550), and Re(650) respectively represent retardation values at a wavelength of 450 nm, a wavelength of 550 nm, and a wavelength of 650 nm. Further, in view of occurrence of retardation, it is preferable that (nx−ny) is 0.0010 or more where nx represents a refraction in a slow axis direction in a film plane at a wavelength of 550 nm and ny represents a refraction in a fast axis direction. It is more preferable that (nx−ny) is 0.0012 or more. If (nx−ny) is below this range, the thickness of the film increases, so that such a film is not suitable for a mobile device and the like and is likely to be inferior in productivity of the film and easiness to handle. The film of the present invention satisfies these requirements, so that the film of the present invention can be used as a retardation film which shows reverse wavelength dispersion in a visible light area and which sufficiently exhibit a retardation.

Further, it is preferable that a refraction in three dimensional directions can be controlled as a property of the retardation film. As to the control of the three-dimensional refraction, the state thereof is expressed as NZ=(nx−nz)/(nx−ny) where ny represents a refraction in a slow axis direction in a film plane, ny represents a refraction in a fast axis direction, and nz represents a refraction in a thickness direction. In case where the retardation film is required to have a uniaxial property, the range of NZ is preferably 1.00 or more and 1.20 or less, more preferably 1.00 or more and 1.10 or less.

The retardation or the three-dimensional refraction can be adjusted to a desired value by the drawing method, the drawing temperature, the drawing scale factor, and the like.

As the drawing method, it is possible to adopt a uniaxial or biaxial heat drawing method. Further, it is possible to carry out special biaxial drawing as described in Tokukai 2001-75098, thereby increasing the refraction in the film thickness direction.

Generally, the drawing scale factor is 1.01 to 4, and it is preferable that the drawing temperature is $(Tg-30)°$ C. or more and $(Tg+30)°$ C. or less with respect to the glass transition temperature Tg. The drawing temperature is particularly preferably $(Tg-20)°$ C. or more and $(Tg+20)°$ C. or less, and more preferably $(Tg-10)°$ C. or more and $(Tg+15)°$ C. or less. Note that, the "drawing temperature" does not necessarily means that an entire temperature of an oven carrying out the drawing has to be evenly in this value, and this term indicates a maximum temperature in the oven carrying out the drawing, so that other point of the oven may deviate from the aforementioned temperature range. Further, the glass transition temperature can be measured by adopting differential scanning calorimetry (DSC) in accordance with a method described in JIS K-7121.

If the drawing temperature is below the aforementioned range, the film is likely to be broken in the drawing, or its haze is likely to increase. Further, if the drawing temperature exceeds the aforementioned range, it is likely to be impossible to obtain a sufficient phase difference. By setting the drawing temperature within the aforementioned range, it is possible to prevent the film from bleaching at the time of drawing and it is possible to reduce unevenness in the phase difference of the resultant retardation film.

Particularly in case where the retardation film is required to have a uniaxial property, it is possible to favorably adopt a method in which free-end uniaxial drawing is carried out at $(Tg+5)°$ C. or higher and $(Tg+30)°$ C. or lower. In case of carrying out the free-end uniaxial drawing with respect to a film made of cellulose derivative in general, its NZ value exceeds 1.20. In order to further decrease the NZ value, it is necessary to carry out special biaxial drawing described in Tokukaihei 5-157911, and it is necessary to laminate a thermal shrinkage film or to carry out a similar process, so that the number of production steps increases. As a result, the yield is likely to decrease and the cost is likely to increase. In the present invention, it is possible to control the NZ value to 1.00 or more and 1.20 or less, further to 1.00 or more and 1.10 or less, by controlling the drawing temperature on the basis of the free-end uniaxial drawing, so that this method is preferable in view of the yield increased by decreasing the number of production steps and the cost decreased accordingly.

Further, a photoelastic coefficient, i.e., a change rate of birefringence in receiving a stress load is preferably $20 \times 10^{-12}$ $m^2/N$ or less. If the photoelastic coefficient is high, great variation occurs in a phase difference caused by an influence of a stress caused by (i) an unevenly laminated film onto a liquid crystal layer or a polarization plate, (ii) a thermal expansion difference between members due to heat emitted from a backlight or an external environment, (iii) shrinkage of the polarization film, (iv) and the like. As a result, this is likely to accelerate color unevenness of the display device and is likely to drop the contrast. A photoelastic coefficient of known polycarbonate is $70 \times 10^{-12}$ $m^2/N$, but the photoelastic coefficient of the retardation film of the present invention satisfies the aforementioned range, and the phase difference hardly varies, so that the retardation film of the present invention can be favorably used particularly for a large screen liquid crystal display device.

In laminating the retardation film of the present invention onto a polarizer so as to form an optical compensation polarization plate, a protection film for polarizer or other optical member may be provided between the polarizer and the retardation film, or the polarizer and the retardation film may be laminated directly onto each other. The present retardation film includes cellulose acylate or cellulose ether, so that the retardation film is firmly bonded to the polarizer. Thus, it is preferable to laminate the retardation film directly onto the polarizer as a protection film for polarizer. In a production method of the optical compensation polarization plate, it is possible to adopt a conventionally known method in combining the retardation plate and in selecting an adhesive used to laminate the retardation film.

EXAMPLES

The following describes Examples of the present invention, but the present invention is not limited to these Examples.

Measurement Method

Material property values and the like which are described in the present specification were obtained by the following evaluation method.

(1) Retardation

A sample of 50 mm×50 mm was cut out from a width-direction center of a film, and wavelength dispersion of a phase difference thereof was measured by an automatic birefringence meter KOBRA-WR (product of Oji Scientific Instruments), and Re(450), Re(550), and Re(650) were calculated by a program included in the device in accordance with thus measured value.

(2) Thickness

The thickness of the sample was measured by an electronic micrometer (product of Anritsu).

(3) Calculation of Substitution Degree of Cellulose Acylate and Cellulose Ether

Each amount of acyl group was measured in accordance with a method described in ASTM-D817-96, and each substitution degree of acyl group was calculated. A residual degree of hydroxyl group was obtained by carrying out such calculation that 3-(total acyl substitution degree).

An amount of alcoxyl group was measured in accordance with a method described in ASTM-D4794-94, and each substitution degree of alcoxyl group was calculated.

(4) Molecular Weight

A number average molecular weight and a weight average molecular weight of each sample were calculated in accordance with gel permission chromatography.
Devices: GPC (product of TOSOH) and 8020 type RI (product of TOSOH)
Columns: K-G, K-806, K-805, and K-803, (products of SHOWA DENKO)
Solvent: Methylene chloride
Flow rate: 1.0 mL/minute
Temperature: 25° C.
Sample solution: A methylene chloride solution whose concentration was 0.1% was filtered by a filter whose pore size was 0.45 μm, and the filtrate was used as a sample solution.
Injection rate: 0.2 mL Standard samples: 12 types of samples of PS-Oligomer Kit (product of TOSOH) were used as standard samples, thereby making an analytical curve.

(5) Selection of Resin

As the component (A), there was used cellulose acetate propionate (CAP482-20 (product of Eastman Chemical Ltd.)) in which DSac+DSpr=2.68, DSpr=2.50, a number average molecular weight was 52200, and a weight average molecular weight was 235000.

As the component (B), there was selected cellulose acetate propionate (CAP482-0.5 (product of Eastman Chemical Ltd.)) in which DSac+DSpr=2.58, DSpr=2.40, a number average molecular weight was 25000, and a weight average molecular weight was 62000 or ethylcellulose (MED70 (product of The Dow Chemical Company)) in which an average ethoxyl degree was 2.3, a number average molecular weight was 61000, and a weight average molecular weight was 183000.

(6) Production of a Retardation Film

Production Example (I) Concerning Example 1, Example 2, and Comparative Examples 1 to 3

17 parts by weight of a resin mixture was dissolved in 83 parts by weight of methylene chloride serving as a solvent, thereby preparing a coating solution. The solution was cast onto a biaxially stretched polyethylene telephthalate (PET) film (having a polyester adhesive layer), whose thickness was 125 μm and which received a stress of $1.0 \times 10^6$ N/m$^2$ in a longer side direction at a room temperature of 23° C. and with a humidity of 15%, by using a comma coater so that a casting direction corresponds to the longer side direction of the PET film. Note that, in Example 1, Example 2, Comparative Example 1, and Comparative Example 2, clearance of the comma coater was adjusted so that the thickness of the secondarily dried film was 100 μm, and in Comparative Example 3, the clearance of the comma coater was adjusted so that the thickness of the secondarily dried film was 50 μm. After casting the solution, the solution was dried at a room temperature for 4 minutes, at 60° C. for 4 minutes, and at 80° C. for 4 minutes. After peeling the resultant film from the PET film, the film was further dried at 110° C. for 30 minutes as the secondary drying with a stress of $2.0 \times 10^5$ N/m$^2$ exerted, thereby obtaining a transparent film. The resultant transparent film was subjected to free-end uniaxial drawing at a drawing temperature of 155° C. so as to be drawn, thereby obtaining a retardation film. A drawing scale factor was set so that a front phase difference is substantially ¼ with respect to a wavelength of 550 nm.

Production Example (II) Concerning Example 3, Example 4, and Comparative Examples 4 to 6

0.5 parts by weight of diethylphthalate was used as a plasticizer, and 16.5 parts by weight of resin mixture was used. In Example 3, Example 4, Comparative Example 4, and Comparative Example 5, the clearance of the comma coater was adjusted so that the thickness of the secondarily dried film was 80 μm. In Comparative Example 6, the clearance of the comma coater was adjusted so that the thickness of the secondarily dried film was 40 μm. The drawing was carried out while causing the resultant to sequentially pass through a heating oven whose temperature was kept at 136° C. and a heating oven whose temperature was kept at 146° C., and the front phase difference was set to substantially 90 nm with respect to light whose wavelength was 550 nm. Other than the foregoing points, the same operation was carried out as in Production Example (I), thereby producing a retardation film.

Production Example (III) Concerning Example 5, Example 6, and Comparative Examples 7 to 9

0.66 parts by weight of diethylphthalate and 21.3 parts by weight of resin mixture were dissolved in 78 parts by weight of mixture solvent obtained by mixing 95.0 parts by weight of methylene chloride, 4.79 parts by weight of ethyl alcohol, and 0.21 parts by weight of isopropyl alcohol, thereby preparing a coating solution. In Example 5, Example 6, Comparative Example 7, and Comparative Example 8, the clearance of the comma coater was adjusted so that the thickness of the secondarily dried film was 80 μm. In Example 9, the clearance of the comma coater was adjusted so that the thickness of the secondarily dried film was 40 μm. After drawing the film, the film was dried at a room temperature for 3 minutes, at 60° C. for 2 minutes, and at 80° C. for two minutes. Other than the foregoing points, the same operation was carried out as in Production Example (II), thereby producing a retardation film.

(7) Durability

Device: TMA device (SSC5200H produced by Seiko Instruments Inc.)
Distance between chucks: 10 mm
Load: 3 g
Sample: A measurement direction was perpendicular to a direction in which the retardation film was stretched, and a width was 3 mm.
Measurement: The sample was heated so that its temperature increases from −60° C. to 110° C. at 10° C./minute and subsequently cooled down so that its temperature decreases from 110° C. to −60° C. at 10° C./minute. This heating/cooling operation was repeated twice, thereby calculating respective dimensional changes at −40° C. (in heating) and 85° C. (in heating) (the dimensional change was a value with respect to 100% indicative of a dimension of the film having been left for 24 hours right after production thereof at a room temperature of 25° C. with a humidity of 50%).

The following shows standards of the durability evaluation.

Failure: The dimensional change at the second operation carried out at −40° C. (in heating) was 0.5% or more or (dimensional change at the first operation)/(dimensional change at the second operation) at 85° C. (in heating) was 0.90 or less.
Acceptable: The dimensional change at the second operation carried out at −40° C. (in heating) was less than 0.5% and 0.4 or more or (dimensional change at the first operation)/(dimensional change at the second operation) at 85° C. (in heating) was less than 0.95.
Favorable: The dimensional change at the second operation carried out was less than 0.4% and 0.4 or more or (dimensional change at the first operation)/(dimensional change at the second operation) at 85° C. (in heating) was less than 0.98 and 0.90 or more.
Excellent: The dimensional change at the second operation carried out at −40° C. (in heating) was less than 0.2% or (dimensional change at the first operation)/(dimensional change at the second operation) at 85° C. (in heating) was 0.98 or more.

(6) Results

Examples 1 to 6, Comparative Examples 1 to 9

Table 1 shows material compositions of the film and evaluation results.

TABLE 1

| | Blending Amount Ratio (wt %) | | | Re(λ)/Re(550) | | | |
|---|---|---|---|---|---|---|---|
| | Component (A) | Component (B) | | Plasticizer Diethyl | | | |
| | CAP482-20 | CAP482-0.5 | MED70 | Phthalate | 450 | 550 | 650 | Durability |
| Example 1 | 35 | 65 | — | — | 0.913 | 1.000 | 1.049 | Favorable |
| Example 2 | 96 | — | 4 | — | 0.913 | 1.000 | 1.049 | Acceptable |
| Example 3 | 33.95 | 63.05 | — | 3 | 0.910 | 1.000 | 1.056 | Favorable |
| Example 4 | 63.05 | 33.95 | — | 3 | 0.892 | 1.000 | 1.064 | Acceptable |
| Example 5 | 33.95 | 63.05 | — | 3 | 0.910 | 1.000 | 1.056 | Excellent |
| Example 6 | 63.05 | 33.95 | — | 3 | 0.892 | 1.000 | 1.064 | Acceptable |
| Comparative Example 1 | 100 | — | — | — | 0.855 | 1.000 | 1.073 | Failure |
| Comparative Example 2 | — | 100 | — | — | 0.920 | 1.000 | 1.028 | Failure |
| Comparative Example 3 | — | — | 100 | — | 1.020 | 1.000 | 0.981 | Failure |
| Comparative Example 4 | 97 | — | — | 3 | 0.859 | 1.000 | 1.069 | Failure |
| Comparative Example 5 | — | 97 | — | 3 | 0.927 | 1.000 | 1.021 | Failure |
| Comparative Example 6 | — | — | 97 | 3 | 1.019 | 1.000 | 0.980 | Failure |
| Comparative Example 7 | 97 | — | — | 3 | 0.859 | 1.000 | 1.069 | Failure |
| Comparative Example 8 | — | 97 | — | 3 | 0.927 | 1.000 | 1.021 | Failure |
| Comparative Example 9 | — | — | 97 | 3 | 1.019 | 1.000 | 0.980 | Failure |

INDUSTRIAL APPLICABILITY

The retardation film of the present invention can be favorably used as an optical film for a display device, particularly as an optical film for a liquid crystal display device. Particularly, in view of a purpose of use of a reverse wavelength dispersion film, the retardation film of the present invention can be used as a retardation film for a reflective liquid crystal display device or the like. Further, the retardation film of the present invention can be used also as a compensation film for polarization plate, further as a protection film for polarizer.

The invention claimed is:

1. A retardation film, made of a material containing a component (A) and a component (B), wherein
the component (A) is cellulose acylate satisfying the following expression (1), and
the component (B) is cellulose acylate or cellulose ether which has a molecular weight different from a molecular weight of the component (A) and whose residual degree of hydroxyl group is 0.30 or more, $$2.20 \leq DSac(A) + DSay(A) \leq 2.90 \quad (1)$$

where DSac(A) represents an acetyl substitution degree of the component (A),
DSay(A) represents a total substitution degree of acyl group which constitutes the component (A) and whose carbon number is three or four, and
wherein the component (A) satisfies the following expression (2), $$DSay(A)/DSac(A) \geq 2 \quad (2), \text{ and}$$

wherein
the components (A) and (B) satisfy the following expression (10), $$10,000 \leq Mn(A) - Mn(B) \leq 100,000 \quad (10)$$

where Mn(A) represents a number average molecular weight of the component (A) on the basis of gel permeation chromatography and Mn(B) represents a number average molecular weight of the component (B) on the basis of the gel permeation chromatography,
Mn(A) and Mn(B) respectively satisfy the following expressions (11) and (12), $$Mn(A) = 30,000 \text{ to } 150,000 \quad (11)$$

$$Mn(B) = 10,000 \text{ to } 50,000 \quad (12)$$

and wherein the amount of the component (A) is 30 to 40 wt %, and the amount of the component (B) is 70 to 60 wt %.

2. The retardation film as set forth in claim 1, wherein
the component (B) is cellulose acylate satisfying the following expressions (3) and (4), and the components (A) and (B) satisfy the following expression (5), $$2.00 \leq DSac(B) + DSay(B) \leq 2.70 \quad (3)$$

$$DSay(B)/DSac(B) \geq 2 \quad (4)$$

$$(DSac(A) + DSay(A)) - 0.05 \geq (DSac(B) + DSay(B)) \quad (5)$$

where DSac(B) represents an acetyl substitution degree of the component (B), and
DSay(B) represents a total substitution degree of acyl group which constitutes the component (B) and whose carbon number is three or four.

3. The retardation film as set forth in claim 1, wherein
cellulose acylate of the component (A) is cellulose acetate propionate satisfying the following expressions (6) and (7), and
cellulose acylate of the component (B) is cellulose acetate propionate satisfying the following expressions (8) and (9), $$2.20 \leq DSac(A) + DSpr(A) \leq 2.90 \tag{6}$$

$$DSpr(A)/DSac(A) \geq 2 \tag{7}$$

$$2.00 \leq DSac(B) + DSpr(B) \leq 2.70 \tag{8}$$

$$DSpr(B)/DSac(B) \geq 2 \tag{9}$$

where DSpr(A) represents a propionyl substitution degree of the component (A), and DSpr(B) represents a propionyl substitution degree of the component (B).

4. The retardation film as set forth in claim 1, wherein
a molecular weight distribution (Mw(A)/Mn(A)) of the component (A) is 2.5 to 5.0, and a molecular weight distribution (Mw(B)/Mn(B)) of the component (B) is 1.5 to 4.0, and (Mw(A)/Mn(A))>(Mw(AB)/Mn(AB)),
where Mw(AB) represents a weight average molecular weight of a mixture of the components (A) and (B) present in the material of retardation film on the basis of the gel permeation chromatography and Mn(AB) represents a number average molecular weight of the mixture of the components (A) and (B) on the basis of the gel permeation chromatography.

5. The retardation film as set forth in claim 1, wherein the following expressions (13) and (14) are satisfied, $$Re(450)/Re(550) = 0.80 \text{ to } 0.95 \tag{13}$$

$$Re(550) < Re(650) \tag{14}$$

where Re(450), Re(550), and Re(650) respectively represent retardation values at a wavelength of 450 nm, a wavelength of 550 nm, and a wavelength of 650 nm.

6. An optical compensation polarization plate, comprising the retardation film as set forth in claim 1.

7. The optical compensation polarization plate as set forth in claim 6, wherein the retardation film is laminated directly onto a polarizer.

8. A method for producing the retardation film as set forth in claim 1,
said method comprising the step of casting onto a support body a solution containing the components (A) and (B).

9. The method as set forth in claim 8, wherein the solution contains methylene chloride.

10. The method as set forth in claim 8, wherein a solvent contained in the solution includes 70 to 99 wt % of methylene chloride and 1 to 30 wt % of alcohol whose carbon number is three or less.

11. The method as set forth in claim 8, wherein the retardation film is drawn at least in an uniaxial direction.

12. A method for producing an optical compensation polarization plate,
said method comprising the step of laminating the retardation film, obtained by the method as set forth in claim 8, onto a polarizer with a protection film for polarizer, and/or other optical member.

13. A method for producing an optical compensation polarization plate,
said method comprising the step of laminating the retardation film, obtained by the method as set forth in claim 8, directly onto a polarizer.

* * * * *